United States Patent [19]
Dauner

[11] Patent Number: 5,957,004
[45] Date of Patent: Sep. 28, 1999

[54] CAM DISK AND METHOD FOR PRODUCING A CAM DISK

[75] Inventor: Bertram Wilhelm-Georg Dauner, Würzburg, Germany

[73] Assignee: Koenig & Bauer-Albert Aktiengesellschaft, Wurzburg, Germany

[21] Appl. No.: 08/901,282

[22] Filed: Jul. 29, 1997

[30] Foreign Application Priority Data

Aug. 26, 1996 [DE] Germany .......................... 196 34 402

[51] Int. Cl.[6] ............................. B23P 15/00; F16H 53/00
[52] U.S. Cl. ........................................... 74/567; 29/888.1
[58] Field of Search ...................... 74/567–569; 29/888.1

[56] References Cited

U.S. PATENT DOCUMENTS

| | | | |
|---|---|---|---|
| 5,729,899 | 3/1998 | Kaywood et al. | 29/888.1 |
| 5,797,180 | 8/1998 | Buchholz | 74/567 X |

FOREIGN PATENT DOCUMENTS

| | | | |
|---|---|---|---|
| 592133 | 2/1934 | Germany | 74/567 |
| 829690 | 1/1952 | Germany | 74/567 |
| 26 49 391 | 5/1978 | Germany . | |
| 3234639 | 3/1984 | Germany | 74/567 |
| 4306621 A1 | 9/1994 | Germany | 29/888.1 |
| 277050A1 | 8/1995 | Germany . | |
| 57-140817 | 8/1982 | Japan . | |
| 59-23156 | 2/1984 | Japan | 74/567 |
| 60-179569 | 9/1985 | Japan | 74/567 |
| 64-4463 | 9/1989 | Japan | 74/567 |
| 1-48427 | 10/1989 | Japan | 74/567 |
| 2-242405 | 10/1991 | Japan | 29/888.1 |
| 6-017823 | 1/1994 | Japan . | |
| 1138576 | 2/1985 | U.S.S.R. | 74/567 |
| 859327 | 1/1961 | United Kingdom | 74/567 |
| 2212595 | 7/1989 | United Kingdom | 74/567 |

*Primary Examiner*—Vinh T. Luong
*Attorney, Agent, or Firm*—Jones, Tullar & Cooper, P.C.

[57] ABSTRACT

A cam disk of a cam drive has a working surface which is provided with a discontinuous hardened rim. An open space in the working surface either receives or is bridged by an insertion piece that has a hardened surface portion. The result is a cam disk with an uninterrupted functional hardened work surface.

7 Claims, 3 Drawing Sheets

CAM DISK AND METHOD FOR PRODUCING A CAM DISK

FIELD OF THE INVENTION

The present invention is directed generally to a cam disk and to a method for producing a cam disk. More particularly, the present invention is directed to a cam disk having a hardened cam running or working surface and to a method for producing such a hardened cam running or working surface. Most specifically, the present invention is directed to a cam disk having a hardened cam running or working surface which includes a hardened insert, and to a method for forming the cam disk with the insert. The running surface is heat treated and quenched to produce the hardened running surface. Spaced start and finish regions of the heat treated and quenched surface are defined by a cam surface open space. A separate insert piece, whose cam running surface has also been hardened, is receivable in the open space.

DESCRIPTION OF THE PRIOR ART

It is well known in the art to utilize cam disks and cooperating cam rollers as cam drive assemblies to actuate gripper fingers, cutting blades, point needle sets and the like in rotary printing presses. The cam disks used in such cam drives typically have a running surface that is engaged by the cam roller. However, as the cam roller or rollers continue to follow the running surface of the cam disk, this surface will rapidly wear if it is not properly hardened. If the cam disk is quite small, the entire cam disk can be hardened by being heat-treated in a furnace, for example. If the size of the cam disk becomes large, it is no longer practical to heat treat the entire cam disk. Instead, a hardening process will be used in which the running surface of the cam disk is partially heated, such as by use of a flame, and is subsequently quenched, such as by a water spray. In such a hardening process, the cam disk running surface and the flame are moved in relation to each other. Either the running surface can be moved with respect to a stationary flame, or a movable flame can be moved about the running surface of the cam disk. One prior art machine that has been used to harden and quench the running surfaces of cam disks is shown in German Published, Non-Examined Patent Application DE-OS 26 49 391. This device utilizes a heating device and a water spray to accomplish the hardening of the running surface of a cam disk.

One limitation of this prior art method and apparatus occurs at the location of the hardened running surface of the cam disk where heating of the running surface is started and stopped. If the area of the running surface that has been heated and hardened in the starting area is again heated at the conclusion of the treatment; i.e. if the cam running surface is heated twice in the area where the treatment starts and stops, that area will be apt to form cracks and other surface irregularities. To avoid this problem, it is typical to leave a gap between the starting and ending areas of the heat treatment. This gap is thus not heat treated and remains unhardened. Such an unhardened portion of the cam disk running surface will be susceptible to increased wear and may be the portion of the cam disk running surface that wears out first.

It will be apparent that a need exists for a cam disk and for a method of producing a cam disk which will yield a disk having a completely hardened running surface which is still free of areas that have been heat treated twice. The present invention provides such a result and is a significant improvement over the prior art.

SUMMARY OF THE INVENTION

It is an object of the present invention to provide a cam disk and a method for producing it.

Another object of the present invention is to provide a cam disk having a hardened cam running surface and to a method for producing such a hardened cam running surface.

A further object of the present invention is to provide a cam disk having a hardened cam running surface which includes a hardened insert and to a method for producing the cam disk with the insert.

As will be discussed in detail in the description of the preferred embodiment, which is presented subsequently, the cam disk in accordance with the present invention is formed with a cam running surface that includes an open space or gap. The two circumferentially spaced edges of this gap define the starting and ending points for the hardening process which is applied to the cam disk running surface. Since these defined starting and ending points are spaced from each other, the running surface of the cam disk, which is engaged by the cam roller or rollers, can be uniformly hardened. A separate insert piece, which is shaped to be received in the open space of the cam disk, is hardened in a separate step. This insert piece is relatively small and can be heat treated in a furnace and then quenched. Once the insert piece has been heat treated, it is then placed in the open space of the cam disk. The result is now a cam disk with a running surface for engagement with a cam roller in which the cam disk running surface, which is engaged by the cam roller, is hardened about its entire periphery. Alternatively, a bridge piece with a hardened surface can be used to bridge the open space.

A particular advantage of the present invention is that it is possible, even with a large cam disk, to provide a circularly extending running surface that is provided with a properly hardened rim layer. This is accomplished by use of a heat hardening process that is applied to the partial peripheral surface of the cam disk, and to the insert piece which is placed in the open gap space. No expensive heat hardening installations, such as large furnaces, are required for the hardening of the running surface of the cam disk which is utilized as part of a cam drive in cooperation with circulating cam rollers.

If a cam disk insertion piece, such as is provided by the present invention, is utilized in an area of the cam disk which is subjected to greater wear, such as would be the situation if the insertion piece were positioned in an area under greater pressure from the circulating cam roller or rollers, the insertion piece can be replaced when it becomes worn, without the need to replace the entire cam disk. This results in reduced costs and in shorter machine down times.

The cam disk and its method of production, in accordance with the present invention overcomes the limitations of the prior art. It is a substantial advance in the art.

BRIEF DESCRIPTION OF THE DRAWINGS

While the novel features of the cam disk and the method for producing a cam disk in accordance with the present invention are set forth with particularity in the appended claims, a full and complete understanding of the invention may be had by referring to the detailed description of the preferred embodiments, which is presented subsequently, and as illustrated in the accompanying drawing figures, in which:

DETAILED DESCRIPTION OF THE PREFERRED EMBODIMENTS

Figure 1:
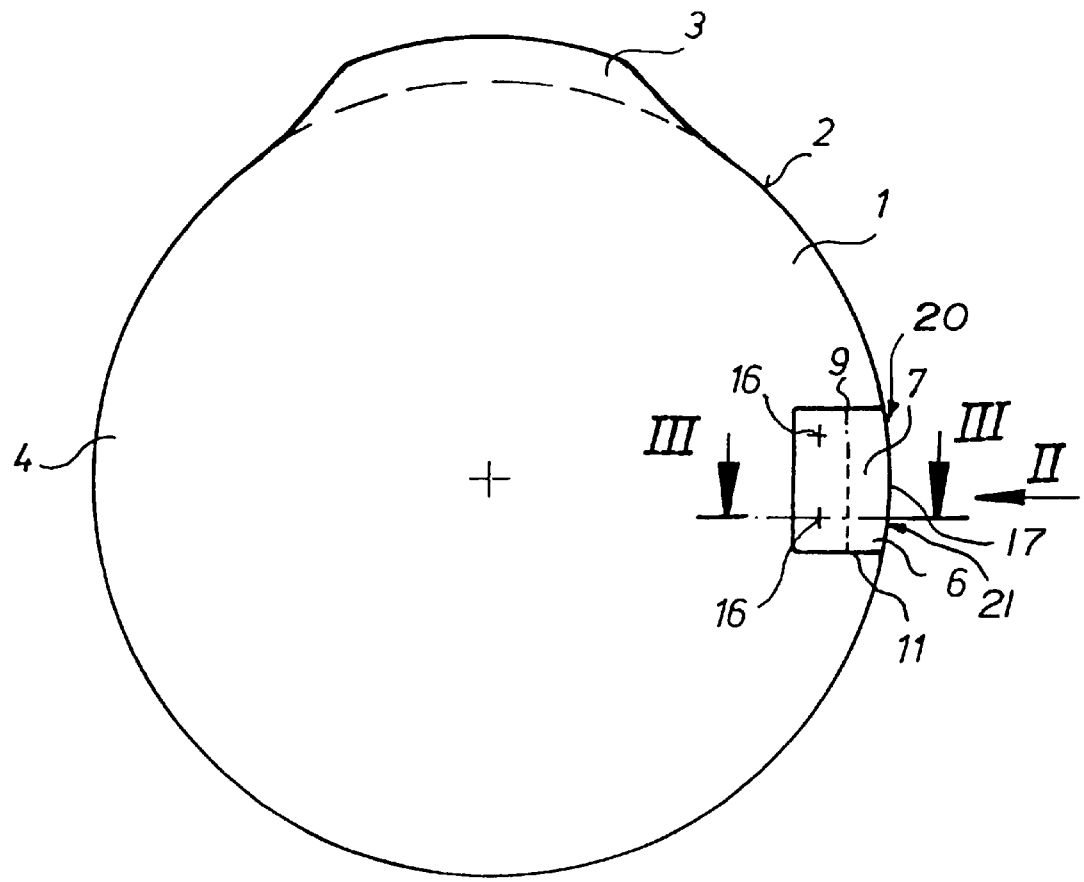
FIG. 1 is a schematic side elevation view of a cam disk in accordance with the present invention.

Referring initially to FIG. 1, there may be seen a cam disk 1 in accordance with the present invention. Cam disk 1 is part of a cam drive system for a variety of elements that can find use in a cylinder of a rotary printing press. The cam disk 1 is provided with a work surface 2 that, in the preferred embodiment, extends around the periphery of the cam disk. This work surface 2 extends through 360° about the periphery of the cam disk 1. A cam roller (not shown) forms a part of the cam drive and rolls off on the work surface 2 of the cam disk 1. This periperal work surface 2 thus forms the running surface or the control surface of the cam disk 1. It will be understood, as alluded to above, that such a cam drive is typically part of a rotary printing press. For example, such a cam drive could form a part of a folding apparatus of a web-fed rotary printing press and could control the operation of gripper points, folding jaws or folding blades. In the embodiment of the cam disk 1 depicted in FIG. 1, it is the jacket or peripheral surface of cam disk 1 that forms the hardened work surface 2.

The cam disk 1, which is depicted in FIG. 1, is shown as being generally circular and as having one area 3 that is raised and that acts as a cam. This cam area 3 could alternatively be several raised areas spaced about the peripheral work surface 2 of the cam disk 1. Alternatively, these cam areas 3 could be depressions instead of raised areas. Other arbitrary shapes of the peripheral work surface 2 of the cam disk 1 could also be provided. It would also be within the scope of the present invention to provide the work surface 2 on an end or front face 4 of the cam disk 1.

Again referring to FIG. 1, the work surface 2 of the cam disk 1, which is depicted as the peripheral or the jacket surface of the cam disk 1, is generally circular. This work surface 2 is made of steel and is hardened. The peripheral work surface 2 of the cam disk 1 is hardened to minimize wear of the work surface 2 which occurs when a cam roller rolls off against the work surface 2. The work surface 2 of the cam disk 1 is heated to the austenitizing temperature of the steel and is subsequently quenched in water. In this heat hardening process, hardening by martensite formation is achieved. Heating of the work surface 2 of the cam disk 1 can be accomplished by use of a flame or by induction coils. With smaller workpieces, such as, for example small cam disks 1, heating of the entire workpiece can take place in a furnace. However, with large workpieces, such as larger cam disks 2, a flame with a following water spray, for example, is used to harden the work surface 2, wherein the flame with the water spray and the workpiece; i.e. cam disk 1 are moved relative to each other. In this way, the work surface 2 to be hardened is only partially heated. If, for example, the flame and water spray are moved from a starting point along the work surface, successive martensite formation in accordance with the course or path of travel of the flame is achieved. With a circular work surface 2, the flame returns to its starting point after an almost completed movement cycle. However, a martensite structure is already present in the area where the starting point and the finishing point overlap and this area is again heated by the flame. Structural changes, such as cracks or other damage can occur in this area during the hardening process. In order to prevent this, the starting point and end point on a circular work surface 2 are customarily not at the same location so that heating is instead terminated in an end area that is situated before the starting point has been reached again. Because of this, an area of the work surface 2 remains unhardened. However, damage to the work surface 2 often occurs during operation of the cam disk 2 in this unhardened area of the work surface 2.

In accordance with the present invention, to obtain a properly hardened, completely circular work surface 2, the cam disk 1 is formed having an open space 6, which interrupts the work surface 2 and into which an insertion piece 7 will be placed. In the radial direction and in the circumferential directions of the cam disk 1, this open space 6 is provided with essentially right angles, as shown in FIG. 1. In its radially outward end, the open space 6 passes completely through the cam disk 1, while a shoulder 8 is disposed on the radial inner end of the open space 6, as may be seen by referring to FIGS. 1 and 3. This shoulder 8 forms a flange which will cooperate with a cooperatively shaped flange or shoulder on the insertion piece 7, as will be discussed subsequently.

Figure 3:
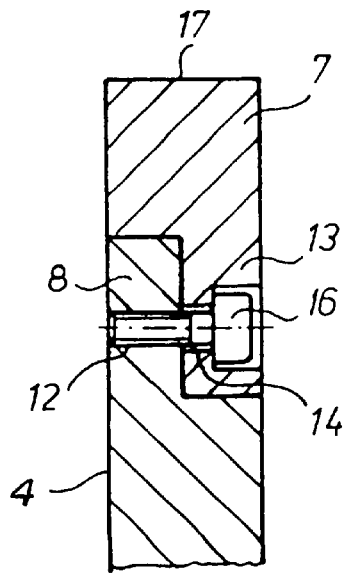
FIG. 3 is a cross-sectional view through the portion of the cam disk indicated by line III—III of FIG. 1.
Figure 2:
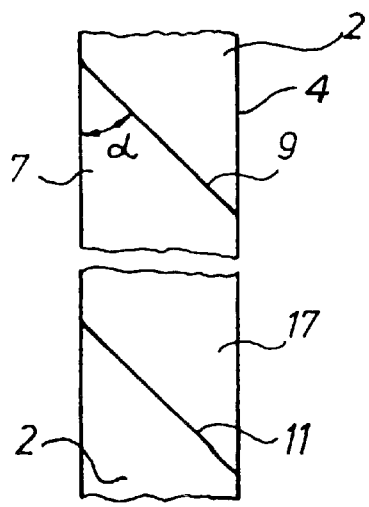
FIG. 2 is a top plan view of a portion of the work surface of the cam disk, taken in the direction indicated by arrow II in FIG. 1.

Turning to FIG. 2, it will be seen that the open space 6 is provided with lateral faces 9 and 11 located at the outer ends of the open space 6 and which are inclined at an angle α of, for example 45°, in relation to the front face 4 of the cam disk 1 so that, when viewing the work surface 2 of the cam disk 1 from above, as seen in FIG. 2, an oblique cut results from these lateral faces 9 and 11. In place of the oblique cut extension, it is also possible for the open space 6 and insertion piece 7 to be embodied with cooperating multiple steps in the circumferential direction of the work surface 2. Two threaded bores 12, for example, one of which is shown in FIG. 3, are cut into the shoulder 8 situated in the inner end of the open space 6 and which is used as a screwing face or as a securement face that will receive the insertion piece 7.

The cross-sectional shape of the insertion piece 7 is complimentary to the shape of the open space 6 in the cam disk and therefore is also provided with a shoulder 13 on its inner end. Two through-bores 14 have been cut into this shoulder 13, through which threaded bolts 16 extend, as seen in FIG. 3. The insertion piece 7 is thereby bolted in place in the open space 6 of the cam disk 1. An outer end of the insertion piece 7 is provided with a work surface 17, which is matched to the curved exterior of the work surface 2 of the cam disk 1.

The work surface 2 of the cam disk 1 is hardened by use of the previously described flame and water spray or by another similar procedure. In the process, the spacing between a starting point 20 and an end point 21 of heating, i.e. a length of the unhardened area of the work surface 2, determine the size of the open space 6. It will be being understood that the length of the open space 6 will be greater than the length of the unhardened area of the work surface 2. The open space 6 can be cut into the cam disk either prior to, or after hardening of the work surface 2. The work surface 2, only interrupted by the open space 6, is hardened completely without the problems which occur when there is an overlap or a double heating of the working surface 2 in the area of the start and termination of the heat treating of the work surface 2. A work surface 17 of the insertion piece 7 is hardened independently of the cam disk 1. The insertion piece 7 is then fastened in the open space 6 of the cam disk 1 and, if required, the resultant circular work surface 2 and 17, i.e. the work surface 2 of the cam disk 1 and the work surface 17 of the insertion piece 7, are further processed together. For example these two hardened work surfaces 2 and 17 can be ground to insure that the resultant work surface is smooth and uninterrupted.

In the method of producing the cam disk 1 in accordance with the present invention, the rim layer of the work surface 2 of the cam disk 1 is hardened, beginning at a starting point, and terminating at an end point, by utilization of a partially acting hardening process, in which the start point and the end point are spaced apart from each other. The open space 6 is cut into the area of the work surface 2 of the cam disk 1 between the start and end points of the hardening, and including the start and end points, prior to or after hardening, so that a length of the open space 6 in the circumferential direction of the work surface 2 is greater than a length of the unhardened area of the work surface 2 because of the partially acting hardening process. The insertion piece 7 with its hardened work surface 17 is then placed into this open space 6. The result is a work surface 2 that has no unhardened portions.

Figure 4:
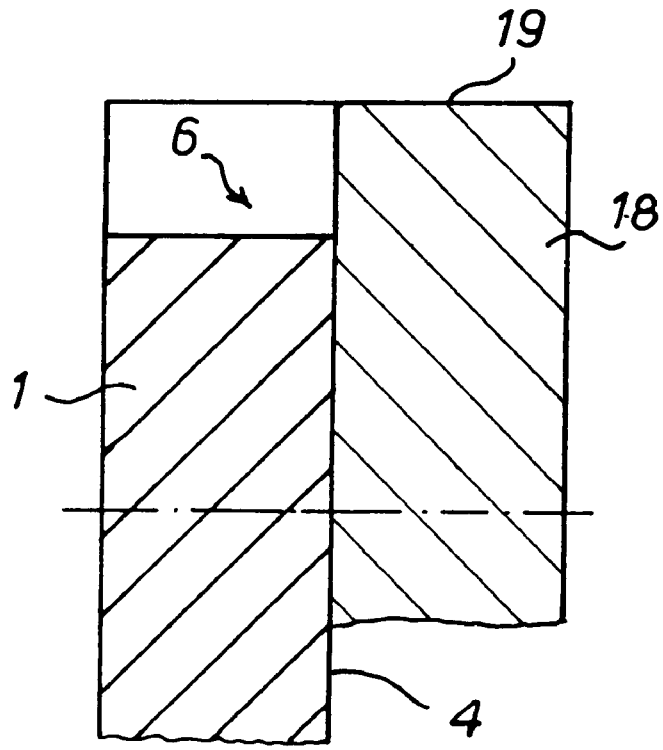
FIG. 4 is a cross-sectional view through an open space of the cam disk indicated by line IV—IV of FIG. 6, and which is provided with a bridging element.

Referring to FIG. 4, it will be understood that it is also possible to fasten a bridging piece 18 with a hardened work surface 19 to an end face 4 of the cam disk 1 with this bridging piece 18 being next to, and bridging the open space 6 in the cam disk 1. This will again provide the cam disk 1 with a functional, circular hardened work surface 2 and 19.

Figure 5:
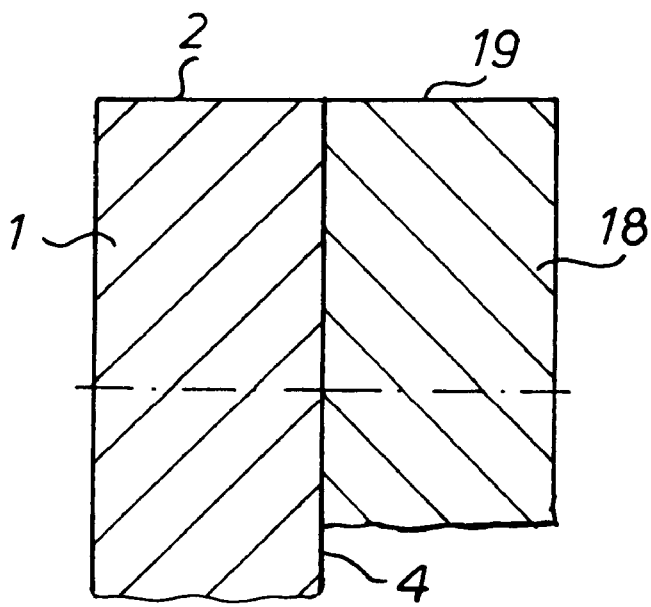
FIG. 5 is a schematic view of a portion of the cam disk indicated by line V—V of FIG. 7, and which is provided in the unhardened area with a bridging element.
Figure 6:
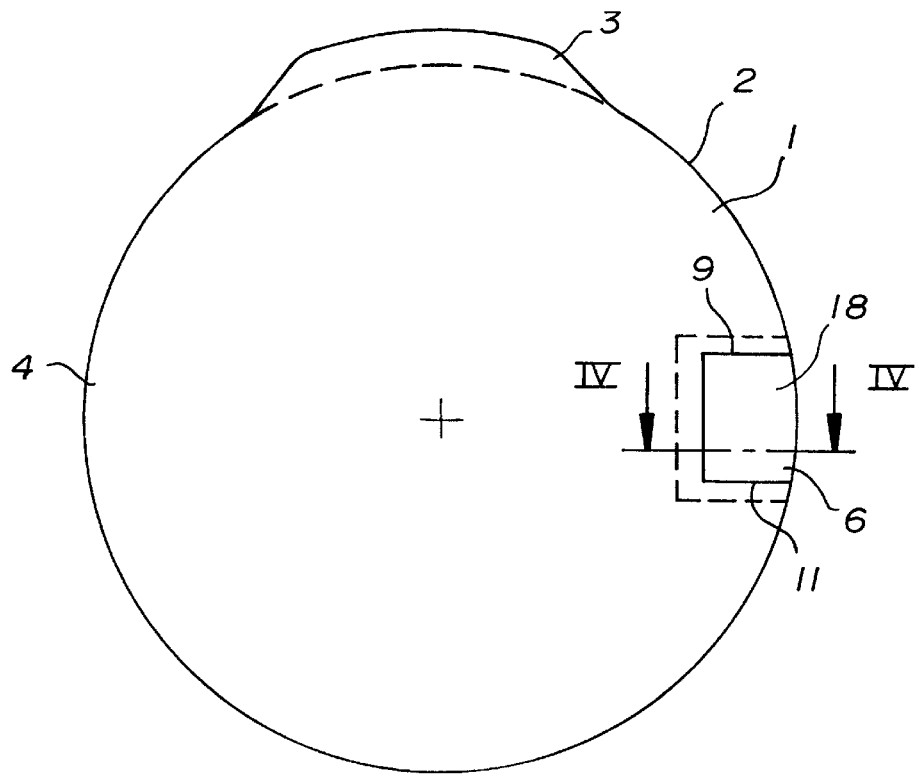
FIG. 6 is a schematic side elevation view of a second preferred embodiment of a cam disk in accordance with the present invention.
Figure 7:
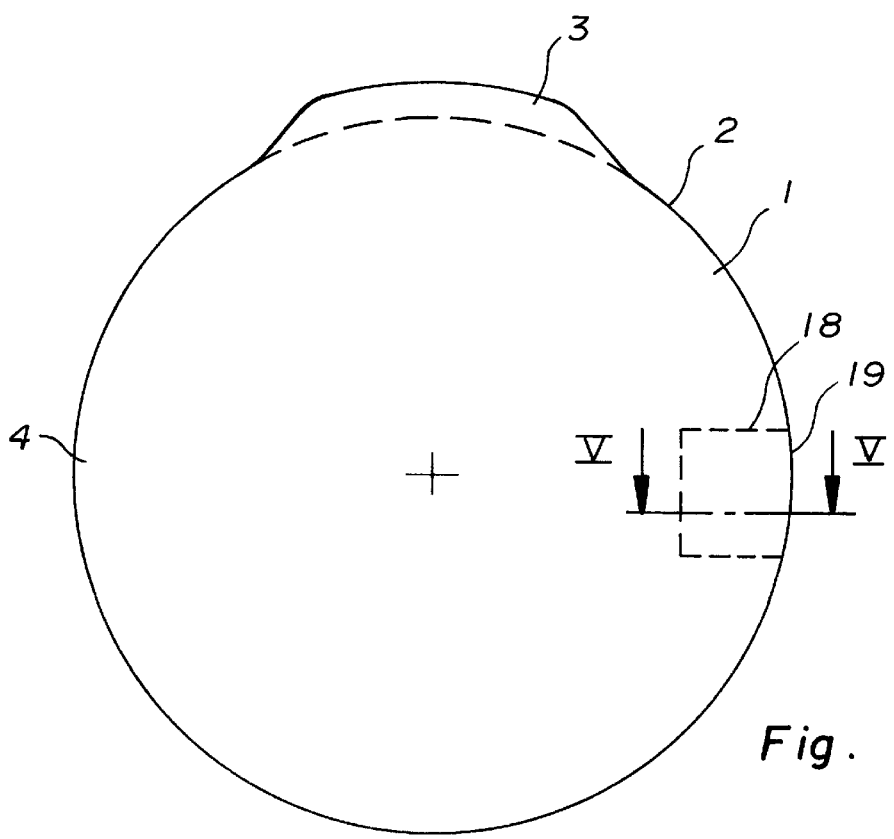
FIG. 7 is a schematic side elevation view of a third preferred embodiment of a cam disk in accordance with the present invention.

In accordance with the present invention, it is also possible not to form a cut-out or open space 6 in the work surface 2 of the cam disk 1 but instead to position a bridging piece 18, with a hardened work surface 19, next to the unhardened portion of the work surface 2 of the cam disk and to thereby provide a hardened work surface in this way, as shown in FIG. 5. In this procedure, the cam disk 1 is provided with an endless hardened work surface that is comprised of the work surface 2 of the cam disk 1 and the work surface 19 of the bridging piece 18.

It will be understood that the term "functional work surface" is to mean that a cam roller, for example, rolling off on the work surface 2 and 17 or 2 and 19 is guided in an uninterrupted path by the curved surface provided by the work surfaces 2 and 17 or 2 and 19.

The open space 6 of the working surface 2 of the cam disk 1, and its cooperatively shaped insert piece 7 can be positioned at the location of the highest stress to which the cam disk will be subjected. If the work surface 17 of the insertion piece 7 begins to show appreciable wear in this area of high stress, the insertion piece 7 can be removed from the cam disk 1 and a new insertion piece 7 can be rapidly substituted. It is also possible to locate the insertion piece 7 in an area of less stress to which the work surface 2 of the cam disk 1 in accordance with the present invention will be subjected.

While preferred embodiments of a cam disk and of a method for producing a cam disk in accordance with the present invention have been set forth fully and completely hereinabove, it will be apparent to one of skill in the art that a number of changes in, for example, the overall size of the cam disk, the shape of the work surface, the drive for the cam disk and the like may be made without departing from the true spirit and scope of the present invention which is accordingly to be limited only by the following claims.

What is claimed is:

1. A cam for use with a cam roller in a cam drive, said cam comprising:

a cam disk including a cam disk periphery;

a hardened work surface formed on said cam disk periphery said hardened work surface extending around said cam disk periphery from a starting point to an end point spaced from said starting point;

an open space on said cam disk periphery between said end point and said starting point, said open space interrupting said hardened work surface on said cam disk periphery; and an insertion piece, said insertion piece having a hardened insertion piece work surface, said hardened insertion piece work surface functionally closing said open space in said hardened work surface on said cam disk periphery between said end point and said starting point of said hardened work surface.

2. The cam of claim 1 wherein said insertion piece is placed in said open space.

3. The cam of claim 1 wherein said cam disk periphery includes a location subjected to high stress and wherein said insertion piece is disposed in said location of high stress acting on said cam disk periphery.

4. The cam of claim 1 wherein said cam disk periphery includes a location subjected to less stress and wherein said insertion piece is disposed in said location of less stress acting on said cam disk periphery.

5. The cam of claim 1 further including first and second lateral walls defining said open space, said first and second lateral wall being inclined in relation to a circumferential direction of said cam disk periphery, said insertion piece being matched in shape to said open space.

6. The cam of claim 2 further including at least one flange in said open space, said insertion piece being matched in shape to said open space.

7. The cam of claim 1 wherein said insertion piece bridges said open space.

* * * * *